(12) United States Patent
Lo

(10) Patent No.: US 10,088,918 B1
(45) Date of Patent: Oct. 2, 2018

(54) ERGONOMIC COMPUTER MOUSE

(71) Applicant: Jack Lo, Redwood City, CA (US)

(72) Inventor: Jack Lo, Redwood City, CA (US)

( * ) Notice: Subject to any disclaimer, the term of this patent is extended or adjusted under 35 U.S.C. 154(b) by 0 days.

(21) Appl. No.: 15/588,649

(22) Filed: May 7, 2017

(51) Int. Cl.
*G06F 3/033* (2013.01)
*G06F 3/0354* (2013.01)

(52) U.S. Cl.
CPC .................. *G06F 3/03543* (2013.01)

(58) Field of Classification Search
CPC .. G06F 3/033; G06F 3/03541; G06F 3/03543; G06F 3/0354; G06F 2203/033; G06F 2203/0334
See application file for complete search history.

(56) References Cited

U.S. PATENT DOCUMENTS

| | | | |
|---|---|---|---|
| D335,874 S | 5/1993 | Chen | |
| D356,558 S | 3/1995 | Montgomery et al. | |
| 5,576,733 A | 11/1996 | Lo | |
| D386,162 S | 11/1997 | Cheng | |
| 5,982,356 A * | 11/1999 | Akiyama | G06F 3/0338 345/156 |
| 6,072,471 A * | 6/2000 | Lo | G06F 3/03543 341/20 |
| D440,972 S | 4/2001 | Chiang et al. | |
| 6,362,811 B1 * | 3/2002 | Edwards | G06F 3/03543 248/118.1 |
| 6,417,843 B1 | 7/2002 | Stephens et al. | |
| D461,188 S | 8/2002 | Lo | |
| D467,924 S | 12/2002 | Hu et al. | |
| 6,724,366 B2 * | 4/2004 | Crawford | G06F 3/03547 345/156 |
| 6,954,198 B2 * | 10/2005 | Shih | G06F 3/0219 345/156 |
| 7,304,636 B2 * | 12/2007 | Willat | G06F 3/03543 345/163 |
| D632,691 S * | 2/2011 | Lo | D14/409 |
| 8,022,930 B2 * | 9/2011 | Odell | G06F 3/03543 345/156 |
| 9,285,898 B2 * | 3/2016 | Bowden | G06F 3/03543 |
| D819,034 S * | 5/2018 | Lo | D14/409 |
| 2003/0038783 A1 * | 2/2003 | Baughman | G06F 3/03543 345/163 |
| 2003/0234765 A1 * | 12/2003 | Suh | G06F 3/03543 345/163 |
| 2004/0246231 A1 * | 12/2004 | Large | G06F 3/03543 345/163 |
| 2006/0028457 A1 * | 2/2006 | Burns | G06F 3/03545 345/179 |

(Continued)

*Primary Examiner* — Joe H Cheng

(57) ABSTRACT

The present ergonomic mouse is shaped for being held by a hand generally in an upright or handshake position. It has a thumb side for engaging a thumb and a finger side for engaging the fingers. Buttons are arranged at a front portion of the finger side. A forward-facing transverse edge and a backward facing transverse edge extend across adjacent buttons and define there between a concave transverse channel for receiving the fingertips. Forward-facing transverse edge provides grip when pulling the mouse backward, and backward-facing transverse edge provides grip when pushing the mouse forward. The channel prevents the mouse from slipping within the hand during maneuvering and enables precise control with a relaxed grip.

2 Claims, 3 Drawing Sheets

(56) References Cited

U.S. PATENT DOCUMENTS

2006/0033714 A1\* 2/2006 Boldin ................ G06F 3/03543
 345/163
2007/0279382 A1\* 12/2007 Large .................. G06F 3/03543
 345/163
2012/0098742 A1\* 4/2012 Pincus ................... G06F 3/033
 345/157

\* cited by examiner

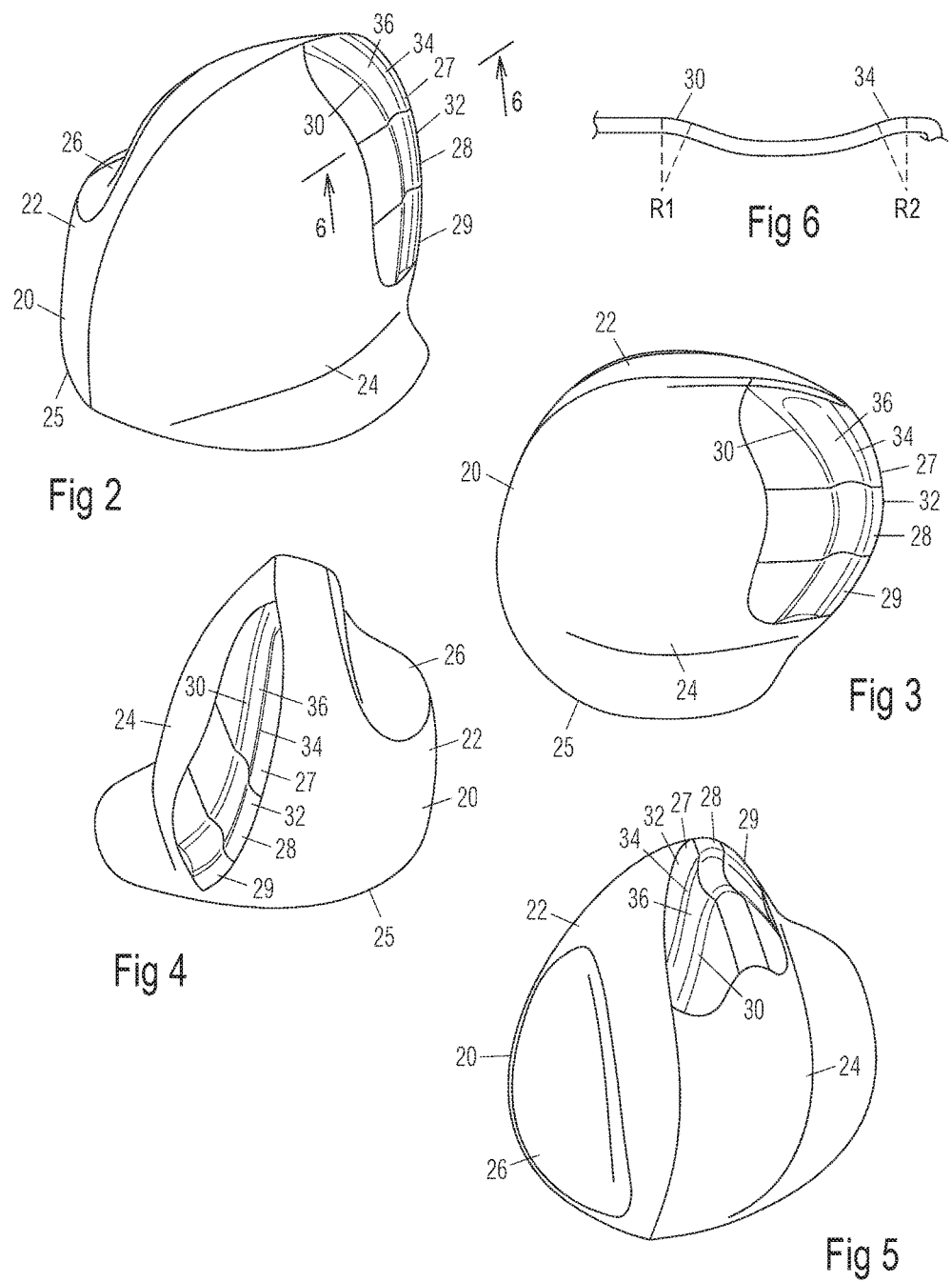

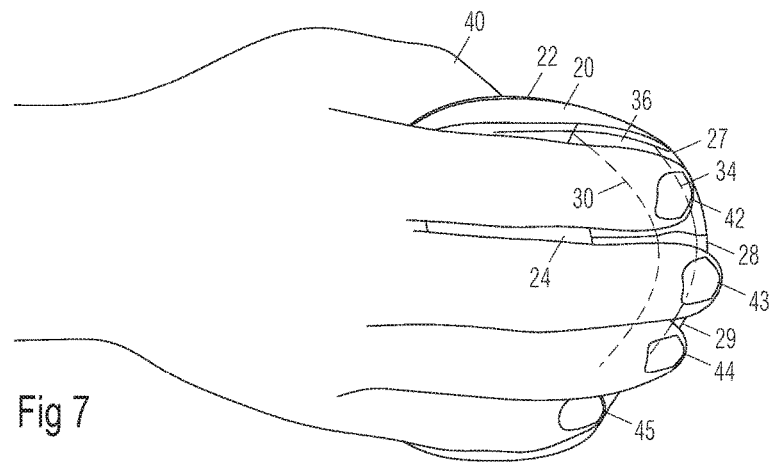
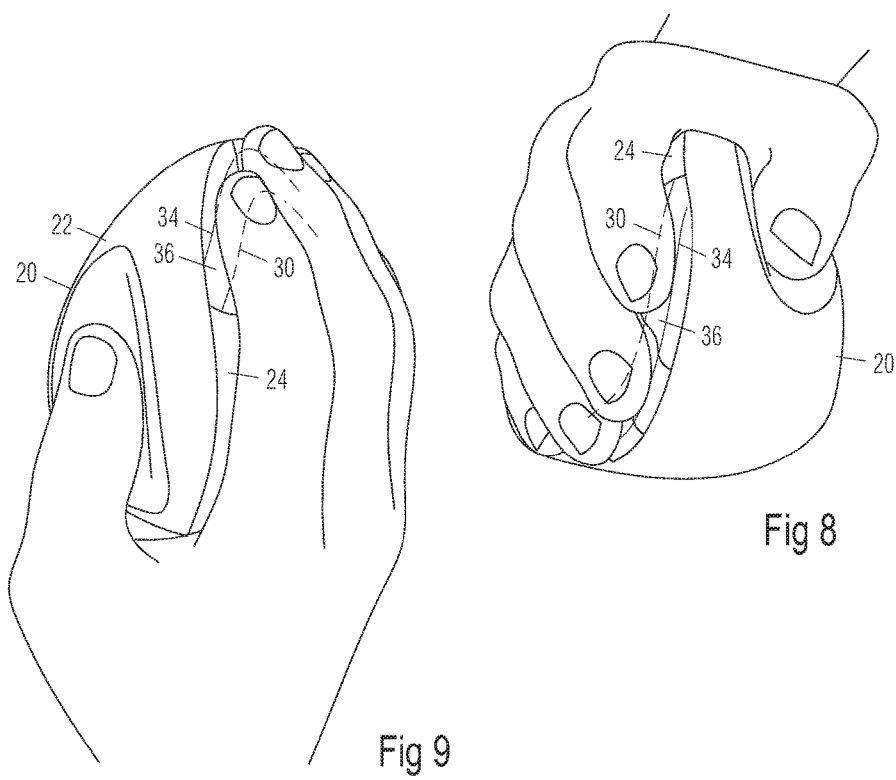

ERGONOMIC COMPUTER MOUSE

BACKGROUND OF THE INVENTION

Field of the Invention

This invention relates generally to computer input devices, and in particular to computer mice.

Prior Art

A typical computer mouse has a generally horizontal top surface between left and right sides for being grasped with a hand in a palm-down position. On a right-hand mouse, the thumb would be on the left side, the index and middle fingers would be on the top surface, and the third and last fingers would be on the right side. Hold the mouse with a palm-down posture twists the forearm nearly 90 degrees from its neutral position so that the two bones in the forearm are crossed. Many users complain of discomfort, pain and even debilitating injury to the wrist after long term use.

My U.S. Pat. No. 5,576,733 discloses an ergonomic computer mouse that supports a hand in an upright handshake position. It avoids the arm twisting associated with conventional mice. My company EVOLUENT® in South San Francisco, Calif. has been making and selling such mice under the trademark "VerticalMouse" since 2002.

U.S. Pat. D356,558 to Montgomery et al., D440,972 to Chiang et al. and D467,924 to Hu et al. each disclose a horizontal mouse with longitudinal grooves that extend along the buttons in a back-to-front direction. My U.S. Pat. D461,188 discloses an upright mouse also with longitudinal grooves on the buttons. Since the buttons are narrow and close together, the grooves provide tactile clues for helping the fingers locate the buttons by feel. Such longitudinal grooves are widely known in the art and appear on many computer mice. These grooves have very gentle slopes in the back to front direction that lack a perceptible edge or beginning and cannot aid grip.

U.S. Pat. D335,874 to Chen discloses a horizontal mouse with a left button with a stepped surface. The step is a right angled depression which does not extend completely across the button. The other button has a smooth surface. The rear edge of the step is located well behind where the finger contacts the button and cannot aid grip. On a horizontal mouse, the left and right sides are gripped, whereas the buttons are not gripped. The fingers merely rest on the buttons. Any indentation on the buttons of prior art horizontal mice is for locating the buttons by feel, not for improving grip. The button of Chen '874 is on a button and is therefore not meant for improving grip.

U.S. Pat. D386,162 to Cheng discloses a horizontal mouse with a very small and shallow dimple on the left button for helping the finger locate the button by feel.

It is widely known in the art of horizontal computer mice that groups of small protruding bumps on the left and right sides may improve grip, such as elements 30 and 37 in FIG. 2 of U.S. Pat. No. 6,417,843 to Stephens et al. However the small bumps irritate the fingers and are uncomfortable to touch. There are no protruding bumps on the buttons of horizontal computer mice to improve grip since the buttons are not gripped to maneuver the mouse. Only the sides are gripped.

The EVOLUENT® "VerticalMouse" is designed to be held in the manner shown in FIG. 1A. The fingertips are on the surfaces of buttons 11-13 of mouse 10. Alternatively, some users hold it with the fingertips on a front edge 14 of the buttons, as shown in FIG. 1B. The edge provides a better grip that prevents the mouse from slipping within the hand when held lightly. However the mouse is actually shifted out of its designed position within the hand when held by the buttons' front edge, therefore the mouse does not fit the hand as well.

BRIEF SUMMARY OF THE INVENTION

The present ergonomic mouse has a finger side angled upward for supporting the fingers of a hand generally in a handshake position. Buttons are arranged on a front portion of the finger side. A forward-facing transverse edge and a backward-facing transverse edge extend continuously across adjacent buttons. The backward-facing transverse edge is forward of the forward-facing transverse edge, thereby defining there between a transverse channel extending continuously across adjacent buttons. The forwarding-facing transverse edge catches the fingers when the mouse is pulled backwards, and the rearward-facing transverse edge catches the fingers when the mouse is pushed forwards. The channel prevents the mouse from slipping within the hand during maneuvering and enables precise control with a relaxed grip.

BRIEF DESCRIPTION OF THE DRAWINGS

FIG. 2 is a right rear quarter perspective view of the present ergonomic mouse.

FIG. 3 is a right side perspective view thereof.

FIG. 4 is a front perspective view thereof.

FIG. 5 is top view thereof.

FIG. 6 is a cutaway view taken along line 6-6 in FIG. 2.

FIG. 7 is a right side perspective view thereof gripped by a hand.

FIG. 8 is a front perspective view thereof gripped by the hand.

FIG. 9 is a top view thereof gripped by the hand.

DETAILED DESCRIPTION OF THE INVENTION

Figure 1A:
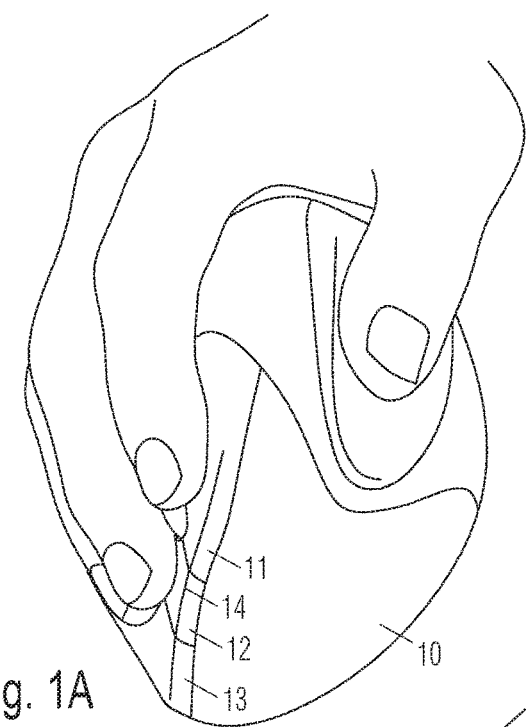
FIG. 1A is a prior art upright mouse gripped by a hand as intended.
Figure 1B:
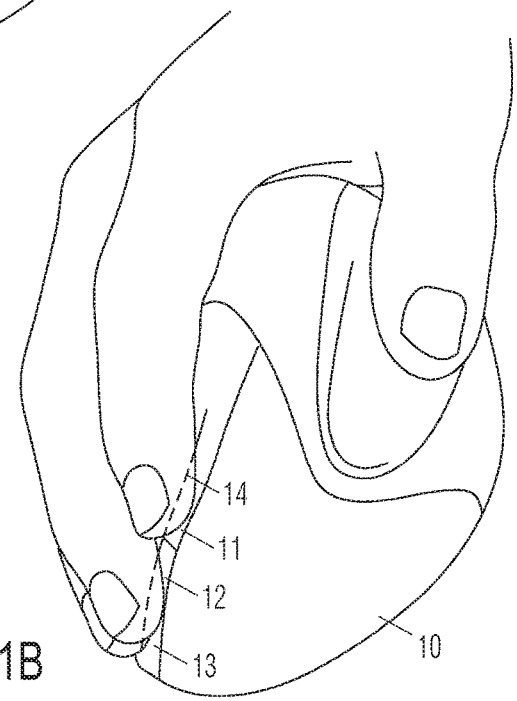
FIG. 1B is the prior art upright mouse in an alternative grip.

As shown in FIGS. 2-5, an ergonomic mouse 20 is shaped for being gripped by a hand generally in a handshake position. Mouse 20 has a thumb side 22 for engaging a thumb and a finger side 24 for engaging the fingers. The sides of the mouse are connected to a bottom 25. A concave thumb rest 26 is provided on thumb side 22. Buttons 27-29 are arranged at a front portion of finger side 24 for being operated by the fingers. Three buttons are shown, but there may be fewer or more buttons. A scroll wheel may also be provided but is not shown.

Mouse 20 has a false front edge or forward-facing transverse edge 30 along the surfaces of the buttons to mimic an actual front edge 32 of the mouse. Forward-facing transverse edge 30 relieves the user from holding the mouse on actual front edge 32 and shifting it out of its designed position. In this context, "transverse" means a direction extending across adjacent buttons.

A false back edge or backward-facing transverse edge 34 is positioned in front of forward-facing transverse edge 30 to define a concave transverse channel 36 extending across the buttons. Channel 36 follows a forwardly bowed path that corresponds to a path defined by the fingertips when placed on the buttons.

In the sectional view in FIG. 6, taken along line 6-6 in FIG. 2, forward-facing transverse edge 30 and backward-facing transverse edge 34 have corresponding radii R1 and R2 that are small enough to provide a suitable amount of grip, but large enough to be comfortable to the touch.

FIGS. 7-9 show a hand positioned on mouse 20 with its thumb 40 against thumb side 22 and its fingers 42-45 against finger side 24. Since the finger side is a generally continuous surface, the fingers are arranged in a contiguous stack. Since channel 36 extends transversely across the buttons, channel 36 enables each fingertip to be within the channel anywhere on a corresponding button without having to be precisely centered on the button. In contrast, prior art longitudinal channels require the fingertips to be centered on each button.

Unlike prior art horizontal mice, mouse 20 cannot have any substantial gripping force applied between the thumb and the last two fingers because the last two fingers do not oppose the thumb in this type of posture. Therefore concave channel 36 is provided to improve grip. When pulling the mouse backward, the user's fingers engage forward-facing transverse edge 30. When pushing the mouse forward, the user's fingers engage backward-facing transverse edge 34. The user may flex his or her fingers to move the mouse forward or backward without moving the entire arm. The mouse may thus be maneuvered accurately with a very light grip without having it shift around within the hand.

I claim:

1. An ergonomic computer mouse, comprising:
   a finger side angled upward for supporting a hand generally in a handshake position;
   a plurality of buttons at a front portion of the finger side for being pressed by the fingers of the hand; and
   a transverse concave channel extending continuously across adjacent buttons, wherein a forwarding-facing transverse edge of the channel catches the fingers when the mouse is pulled backward, and a rearward-facing transverse edge of the channel catches the fingers when the mouse is pushed forward to improve grip when maneuvering the mouse.

2. An ergonomic computer mouse, comprising:
   a finger side angled upward for supporting a hand generally in a handshake position;
   a plurality of buttons at a front portion of the finger side for being pressed by the fingers of the hand; and
   a forward-facing transverse edge and a backward-facing transverse edge extending continuously across adjacent buttons, wherein the backward-facing transverse edge is forward of the forward-facing transverse edge thereby defining there between a concave transverse channel extending continuously across adjacent buttons, wherein the forwarding-facing transverse edge catches the fingers when the mouse is pulled backward, and the backward-facing transverse edge catches the fingers when the mouse is pushed forward to improve grip when maneuvering the mouse.

* * * * *